United States Patent
Hofacker et al.

(10) Patent No.: US 11,077,498 B2
(45) Date of Patent: Aug. 3, 2021

(54) METHOD FOR MANUFACTURING A COMPONENT BY THERMAL SPRAYING

(71) Applicant: Siemens Aktiengesellschaft, Munich (DE)

(72) Inventors: Oliver Hofacker, Berlin (DE); Ursus Krueger, Berlin (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 414 days.

(21) Appl. No.: 15/565,974

(22) PCT Filed: Mar. 30, 2016

(86) PCT No.: PCT/EP2016/056886
§ 371 (c)(1),
(2) Date: Oct. 12, 2017

(87) PCT Pub. No.: WO2016/165938
PCT Pub. Date: Oct. 20, 2016

(65) Prior Publication Data
US 2018/0056395 A1 Mar. 1, 2018

(30) Foreign Application Priority Data
Apr. 16, 2015 (DE) .................. 10 2015 206 892.7

(51) Int. Cl.
*B22F 3/115* (2006.01)
*B22D 23/00* (2006.01)
(Continued)

(52) U.S. Cl.
CPC ............ *B22F 3/115* (2013.01); *B22D 23/003* (2013.01); *B22F 12/00* (2021.01); *B29C 64/153* (2017.08);
(Continued)

(58) Field of Classification Search
CPC ........ B22D 23/003; B22F 3/115; C23C 24/04
(Continued)

(56) References Cited

U.S. PATENT DOCUMENTS

| 5,203,944 A | 4/1993 | Prinz et al. .................. 156/247 |
| 6,397,922 B1* | 6/2002 | Sachs ...................... B22C 9/00 164/4.1 |

(Continued)

FOREIGN PATENT DOCUMENTS

| CN | 103243324 A | 8/2013 | ............. C23C 26/02 |
| DE | 102006014835 A1 | 10/2007 | ............. B22F 3/105 |

(Continued)

OTHER PUBLICATIONS

German Office Action, Application No. 102015206692.7, 8 pages, dated Dec. 16, 2015.
(Continued)

*Primary Examiner* — Kevin E Yoon
*Assistant Examiner* — Jacky Yuen
(74) *Attorney, Agent, or Firm* — Slayden Grubert Beard PLLC

(57) ABSTRACT

The present disclosure relates to manufacturing methods. The teachings thereof may be used to manufacture a component in which the component is applied by thermal spraying with a coating jet carrying building material. For example, a method for manufacturing a component may include: producing a mold for the component layer-by-layer on a building platform using a generative process incorporating data describing the mold; building the component in the mold by filling the mold with a building material using thermal spraying with a coating jet; and removing the mold from the component.

8 Claims, 4 Drawing Sheets

(51) Int. Cl.
*C23C 24/04* (2006.01)
*B33Y 10/00* (2015.01)
*B33Y 30/00* (2015.01)
*B29C 64/153* (2017.01)
*B22F 12/00* (2021.01)
*B22F 10/10* (2021.01)

(52) U.S. Cl.
CPC .............. *B33Y 10/00* (2014.12); *B33Y 30/00* (2014.12); *C23C 24/04* (2013.01); *B22F 10/10* (2021.01); *B22F 2998/10* (2013.01); *B22F 2999/00* (2013.01); *Y02P 10/25* (2015.11)

(58) Field of Classification Search
USPC .......................................................... 164/46
See application file for complete search history.

(56) References Cited

U.S. PATENT DOCUMENTS

| | | | | |
|---|---|---|---|---|
| 7,087,109 | B2* | 8/2006 | Bredt ...................... | C04B 28/14 106/691 |
| 9,132,508 | B2 | 9/2015 | Dautl et al. | |
| 2002/0069996 | A1 | 6/2002 | Collins et al. .................. | 164/45 |
| 2006/0165546 | A1 | 7/2006 | Yamada et al. .................. | 419/6 |
| 2006/0188650 | A1 | 8/2006 | Sauer ........................... | 427/133 |
| 2007/0029693 | A1* | 2/2007 | Wigand .................. | B33Y 30/00 264/113 |
| 2014/0202595 | A1* | 7/2014 | Hofmann ............. | B22D 23/003 148/522 |
| 2015/0014885 | A1* | 1/2015 | Hofmann ................ | B29C 64/20 264/294 |

FOREIGN PATENT DOCUMENTS

| | | | |
|---|---|---|---|
| DE | 102009049707 A | 7/2011 | ............... C23C 4/06 |
| DE | 102010063725 A1 | 6/2012 | ............. B23B 29/00 |
| DE | 102012107297 A1 | 6/2014 | ............. B22F 3/105 |
| DE | 102013007737 A1 | 11/2014 | ............. B05B 13/06 |
| EP | 0490546 A1 | 6/1992 | ............. B22F 3/115 |
| WO | 2016/165938 A1 | 10/1916 | ............. B22F 3/105 |
| WO | WO-2004035250 A1 * | 4/2004 | ............. C22C 38/04 |
| WO | 2004/091907 A1 | 10/2004 | ............... B22C 9/06 |

OTHER PUBLICATIONS

International Search Report and Written Opinion, Application No. PCT/EP2016/056886, 16 pages, dated Jun. 16, 2016.
Chinese Office Action, Application No. 201680022057.9, 7 pages, dated Nov. 21, 2018.
Chinese Office Action, Application No. 201680022057.9, 9 pages, dated May 15, 2020.

* cited by examiner

METHOD FOR MANUFACTURING A COMPONENT BY THERMAL SPRAYING

CROSS-REFERENCE TO RELATED APPLICATIONS

This application is a U.S. National Stage Application of International Application No. PCT/EP2016/056886 filed Mar. 30, 2016, which designates the United States of America, and claims priority to DE Application No. 10 2015 206 892.7 filed Apr. 16, 2015, the contents of which are hereby incorporated by reference in their entirety.

TECHNICAL FIELD

The present disclosure relates to manufacturing methods. The teachings thereof may be used to manufacture a component in which the component is applied by thermal spraying with a coating jet carrying building material.

BACKGROUND

In cold-gas spraying, particles intended for coating are accelerated, usually to ultrasonic velocity, by means of a convergent-divergent nozzle, to adhere to the surface to be coated as a result of their imparted kinetic energy. This uses the kinetic energy of the particles, which leads to a plastic deformation of and melting the coating particles at their surface when they impinge. For this reason (in comparison with other thermal spraying processes), this process is referred to as cold-gas spraying. It is carried out with comparatively low temperatures, at which the coating particles remain substantially solid. Preferably used for cold-gas spraying, which is also referred to as kinetic spraying, is a cold-gas spraying installation, which has a gas heating device for heating up a gas. Connected to the gas heating device is a stagnation chamber, which is connected on the output side to the convergent-divergent nozzle, preferably a Laval nozzle. Convergent-divergent nozzles have a converging portion and a diverging portion, which are connected by a nozzle neck. The convergent-divergent nozzle produces on the output side a powder jet in the form of a gas stream with particles therein at high velocity, preferably ultrasonic velocity.

On the other hand, there is the desire to manufacture components by primary forming processes, while at the same time maintaining sufficiently high dimensional stability and keeping the formation of internal stresses in the component at an acceptable level. For example, such components can be produced by casting technology. For one-off fabrications or small series, however, the production of a suitable mold is not worthwhile. For the generative production of components, until now additive manufacturing processes, for example laser melting according to DE 10 2006 014 835 A1, have been used. These techniques have been focused on particularly delicate structures with a small volume. However, with demanding requirements for dimensional stability, a reworking of the surfaces is then necessary. Components may also be manufactured by using both processes, as disclosed by DE 10 2009 049 707 A1.

SUMMARY

The teachings of the present disclosure may provide a method by which components with the following properties can be generatively manufactured. On the one hand, these components are to have the high dimensional stability of components produced by means of additive manufacturing, for example laser melting. On the other hand, these components are to allow themselves to be manufactured with the high build-up rates that are achieved by thermal spraying processes, for example by cold-gas spraying. The building material that is used in thermal spraying processes is usually a powder. Energy is imparted to this powder by the thermal spraying process and is then available for the depositing of the particles. The thermal spraying involves producing a coating jet, with which the building material is transported to the component to be coated.

Some embodiments may include a method for manufacturing a component (40) in which the component (40) is built up by thermal spraying with a coating jet (31) carrying building material, characterized in that a mold (38) for the component (40) to be manufactured is produced layer by layer on a building platform (13) by a generative process on the basis of data describing the mold (38), the component (40) is built up in the mold (38), in that the mold (38) is filled with the building material by thermal spraying and the mold (38) is removed from the component (40).

In some embodiments, cold-gas spraying is carried out as the thermal spraying for manufacturing the component (40).

In some embodiments, selective laser melting and/or selective laser sintering and/or selective electron-beam melting are used as the generative process for producing the mold (38).

In some embodiments, when manufacturing the component, the generative production of the mold (38) is carried out alternately with the filling of the mold (38) with the building material.

In some embodiments, the mold (38) is produced with a stiffening structure that consists of struts (42).

In some embodiments, the struts (42) form a framework (41).

In some embodiments, the building material is applied to the component (40) that is being created on a wall surface (41) of the mold with such a direction of the coating jet (31) that this direction lies within a spray cone provided for the thermal spraying with respect to a surface to be coated of the component (40) that is being created and outside the spray cone provided for the thermal spraying with respect to the wall surface (39).

In some embodiments, for changing the direction of the coating jet, the building platform (13) is pivoted. In some embodiments, the generative production process is also used to produce a partial volume (44) of the component (40).

In some embodiments, the thermal spraying process is also used to produce a partial volume (46) of the mold (38).

Some embodiments may include an installation for manufacturing a component (40) in which a device for thermal spraying of building material is provided, while in addition a building platform (13) for the component (40) to be manufactured is provided and a device for a generative process for manufacturing objects layer by layer on the basis of data describing these objects is provided, characterized in that the building platform (13) is movably mounted in a bearing (14) in such a way that the building platform (13) is pivotable from a horizontal position into a sloping position.

In some embodiments, a device (25) for cold-gas spraying is provided as the device for thermal spraying.

In some embodiments, a device (25) for selective laser melting and/or for selective laser sintering and/or for selective electron-beam melting is provided as the device for the generative process for manufacturing objects layer by layer on the basis of data describing these objects.

In some embodiments, the device for thermal spraying is movably mounted in a bearing (27) in such a way that this device (13) is axially displaceable and pivotable.

BRIEF DESCRIPTION OF THE DRAWINGS

Further details of the teachings herein are described below on the basis of the drawing. The same or corresponding drawing elements are respectively provided with the same designations and are only explained more than once to the extent that there are differences between the individual figures, in which.

DETAILED DESCRIPTION

Figure 1:
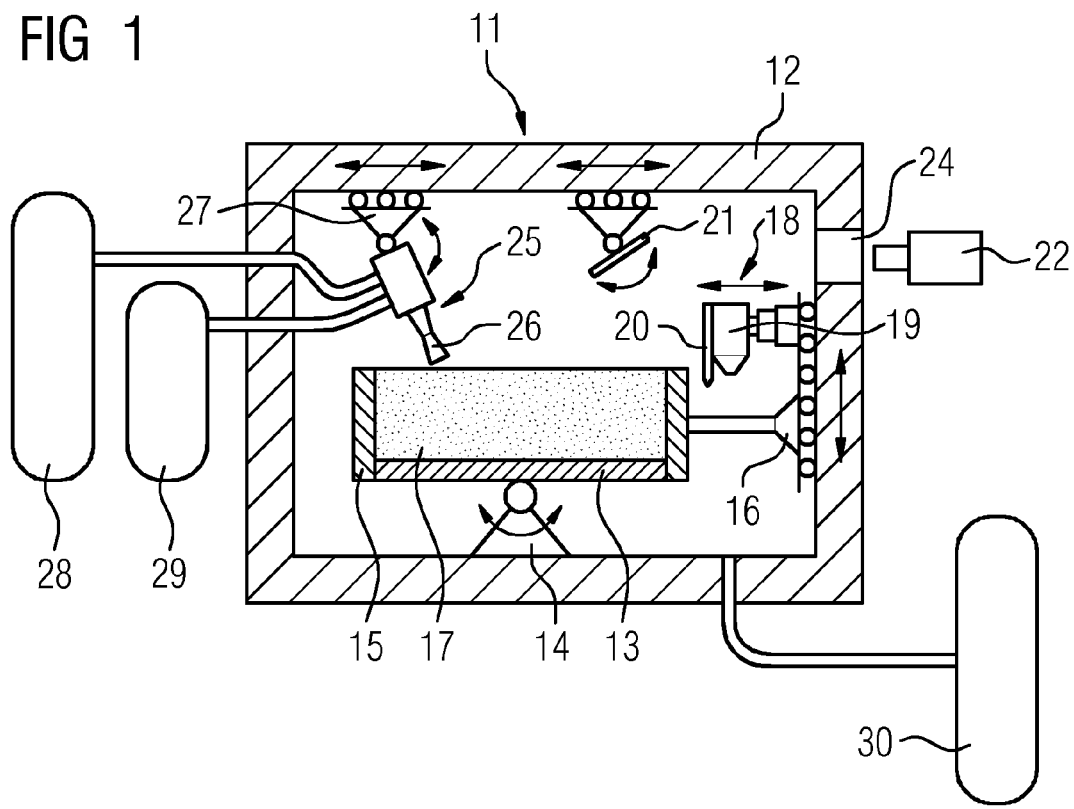
FIG. 1 shows an embodiment of the installation according to the teachings herein schematically as a sectional representation.

In a first substep, a mold for the component to be manufactured is produced layer by layer on a building platform, which is part of the manufacturing installation, by a generative process on the basis of data describing the mold. The data describing the mold usually take the form of a CAD dataset, which reproduces the three-dimensional structure of the mold and, for the purpose of layer by layer manufacture, is divided up into slices incorporating the geometry of the layers. With the aid of these data, layer by layer of the mold can be produced.

In a subsequent substep, the mold is filled with the building material by thermal spraying. In this way it is possible to avoid the disadvantage of thermal spraying processes in the manufacture of solid components that dimensional stability of the components produced can only be maintained with comparatively great tolerances. Furthermore, it is also possible for components that have outer delimitations aligned perpendicularly to the alignment of the coating jet to be manufactured. Here, the limits of the process of thermal spraying according to the prior art, in particular cold-gas spraying, mean that only side flanks that are inclined toward the interior of the component can be produced in the free forming of components by means of thermal spraying. The mold makes it possible however that the coating jet can always fill the mold up to a wall surface thereof even with relatively high application thicknesses, and consequently any desired structures (for example walls aligned parallel with the coating jet) can be produced by thermal spraying.

The expenditure of material for the mold is reduced over known methods. This is so because it can be produced in the form of lattices (frameworks), only the wall surfaces of the mold having to be of a closed configuration, in order that the form of the component to be manufactured by thermal spraying is clearly defined.

In some embodiments, the manufacturing of the component is performed by cold-gas spraying. This process has the advantage that comparatively high application rates can be achieved. Furthermore, thermally sensitive building materials can also be processed, since the particles of the building material are not melted, but remain adhering as a result of their kinetic energy. The thermal loading of the mold can consequently also be advantageously kept low.

In some embodiments, selective laser melting and/or selective laser sintering and/or selective electron-beam melting are used as the generative process for producing the mold. These are generative production processes in which the mold is produced in a powder bed, which is applied layer by layer to the building platform. Highly accurate production is then possible, the generative production processes mentioned primarily allowing metallic materials to be deposited. These also withstand thermal loading of the subsequent thermal spraying. They must do so because, even when cold-gas spraying is used, depending on the material chosen, the particles of the building material have to be preheated, the impingement of the particles on the component that is being created also having the effect that they are heated up. With lower thermal loading, it is also possible to use plastics for the mold. These can for example be built up layer by layer by means of a 3D printing process, without the production of a powder bed being necessary.

In other words, both the necessary devices for additive manufacturing (for example laser melting) and the necessary devices for cold-gas spraying are installed in one process chamber. Consequently, both laser melting and cold-gas spraying can take place in the process chamber.

In some embodiments, an installation specified at the beginning for manufacturing components includes a building platform for the component to be manufactured. Apart from the device for the thermal spraying of building material, which is integrated in the installation, a device for a generative process for manufacturing objects layer by layer on the basis of data describing these objects is also provided. The device for thermal spraying may be prepared for the spraying processes already explained above, while the device for the generative process likewise comprises the installations already mentioned. These are in particular a device for cold-gas spraying for the thermal spraying and a device for selective laser melting and/or for selective laser sintering and/or for electron-beam melting for the generative production process.

In some embodiments, the building platform is movably mounted in a bearing in such a way that the building platform is pivotable from the horizontal position into a sloping position. In some embodiments, the device for thermal spraying is movably mounted in a bearing in such a way that this device is axially displaceable and pivotable. The pivotable mounting of the two components mentioned may allow the spraying angle of the coating jet to be changed with respect to a perpendicular (normal) taken to the surface to be coated at the point of impingement of the coating jet. The sum of all those spraying angles at which the building material can be deposited forms the so-called spray cone, the lateral surface of which gives the limits within which deposition of the coating material at various spraying angles is possible. In some embodiments, by pivoting the device for thermal spraying and/or the building platform, it is consequently possible to influence specifically whether the coating material in the coating jet can be deposited on a substrate. This may be used specifically in order that adherence of the coating material to the wall surfaces of the mold is reduced or even completely ruled out. At the same time, with tangential alignment of the coating jet on the wall surface of the mold, the spraying angle with respect to material already deposited in the mold can be aligned in such a way as to make it possible for the layer material to be deposited on the component that is being created. This has the advantages already described for the demolding of the finished component.

In some embodiments, a method in which both cold-gas spraying in particular and laser melting in particular are used for manufacturing the component. In some embodiments, the laser melting is only performed to produce a mold for the component.

In some embodiments, when manufacturing the component, the generative production of the mold is carried out alternately with the filling of the mold with the building material. The mold can therefore be produced in multiple steps alternately with the thermal spraying (cold-gas spraying). The cold-gas spraying serves for filling the mold, so that rapid application of material is possible, with at the same time little formation of internal stresses. Thus, even parts with undercuts can be produced well, in that the parts of the mold that have undercuts are only produced when the regions of the component that have undercuts have already been produced by the thermal spraying.

In some embodiments, to make demolding easier, the cold-gas jet may, as far as possible, be guided along tangentially on the inner side of the mold. This means that there is only little adherence, or even no adherence at all, between the mold and the component, which makes demolding easier. When there are undercuts, demolding of the component may take place by destroying the mold (so-called lost mold). It may be destroyed mechanically or else for example by being dissolved by electrochemical means, if the material of the mold is less precious than the material of the component. It is also possible for the two principles of destruction to be combined.

In some embodiments, the mold is produced with a stiffening structure that consists of struts. In some embodiments, the struts form a framework. This allows stable molds to be produced with little expenditure of material in a short building time.

The method according to the invention and the device suitable for it, for combined cold-gas spraying and laser melting, may take advantage of the benefits of the two processes. The buildup of the mold takes place by means of additive manufacturing and can to this extent be carried out with high dimensional stability. In order to destroy the mold easily, it may be delicately supported by a lattice-like supporting framework, so that only the inner surface has to be of a solid form. This may shorten the production time and reduce the consumption of material for the mold. The component itself can be manufactured by cold-gas spraying. At least the solid structures of the component can in this way be produced at lower cost and with lower internal stresses than by a generative production process.

In some embodiments, the additive manufacturing or generative production process (in particular laser melting) may of course also be used to produce certain parts of the component. This is worthwhile for example for internal structures that are to be stabilized in the component by a supporting structure in the form of a supporting framework. Another use for the generative production process is that of producing partial volumes of the component with complex geometry, where accessibility for the coating jet could only be ensured by frequent changing of the production steps of the generative buildup of the mold and the manufacture of the component.

An example installation 11 as shown in FIG. 1 may include a process chamber, in which, as explained in more detail below, thermal spraying and generative manufacturing of workpieces can be performed in a powder bed. Provided for this purpose in the installation is a building platform 13, which is arranged pivotably on a bearing 14. This makes pivoting of the building platform 13 possible, so that it can be inclined during the thermal spraying (compare FIGS. 5 and 8). The building platform also has a side delimitation 15, which is displaceable vertically in a bearing 16 and in this way is suitable for receiving, together with the building platform 13, a powder bed 17 that is to be applied layer by layer. Also provided on the bearing 16 is a metering device 18, having a powder container 19 and a doctor blade 20, with which the powder can be distributed layer by layer on the powder bed 17.

In some embodiments, in the process chamber 12 is a deflecting optical system 21, with which a laser beam 23 produced by a laser (cf. for example FIG. 4) can be directed onto the powder bed 17. The laser 22 is located outside the process chamber 12 and enters the process chamber 12 through a window 24.

In some embodiments, in the process chamber 12 is a device 25 for thermal spraying, this being a cold-gas spraying installation with a convergent-divergent nozzle 26. The device is held by a bearing 27, which is both suspended axially displaceably on the ceiling and can be pivoted. The cold-gas spraying installation has a storage container 28 for a process gas and a storage container 29 for the coating material, which is not represented any more specifically. Remains of the process, i.e. coating material that is not deposited, and remains of the powder bed can be introduced into a recycling container 30, which is likewise connected to the process chamber 12.

The production steps according to FIGS. 2 to 10 can be carried out with an installation 11 according to FIG. 1. For the sake of simplicity, in FIGS. 2 to 10 this installation is not represented completely, but only those components of the installation that are used in the respective production step.

Figure 2:
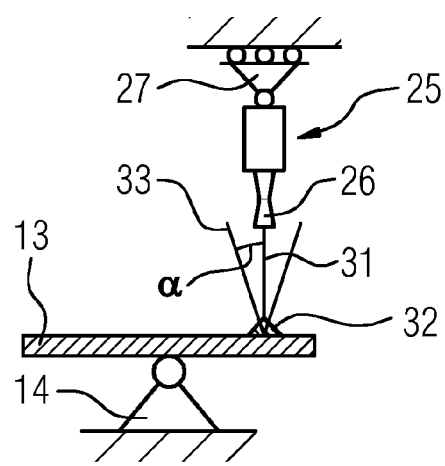
FIGS. 2 to 11 show method steps of an embodiment of the method according to the teachings herein.

In FIG. 2, the building platform 13 is aligned horizontally. With the device 25 for cold-gas spraying, a coating jet 31 is directed directly onto the surface of the building platform 13. As a result, a narrow ridge 32 is produced. Since the nozzle 26 of the device 25 is aligned such that the coating jet 31 impinges on the building platform 32 perpendicularly, according to FIG. 2 the coating jet 31 lies precisely in the normal of an indicated spray cone 33, the position of the lateral surface of this spray cone 33 being defined by an angle $\alpha$ in relation to the normal that is perpendicular to the building platform 13. When the coating jet lies within the spray cone 33, coating of the surface to be coated (here the building platform 13) is possible.

Figure 3:
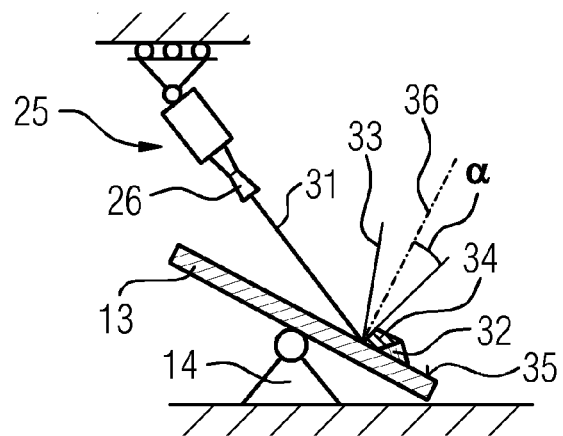

In FIG. 3, the ridge 32 serves as a coating surface for the forming of a starting layer 34, which is built up along the building platform 13. It can also be seen that the building platform 13 and the device 25 for cold-gas spraying are inclined in such a way that the surface 35 of the building platform 13 can no longer be coated in an adhering manner with the particles of the coating jet 31. This is evident from the fact that the coating jet 31 lies outside the spray cone 33, which is defined by the normal 36 to the surface 35. This advantageously has the effect that the finished component can later be separated easily from the building platform 13 (cf. FIG. 10).

Figure 4:
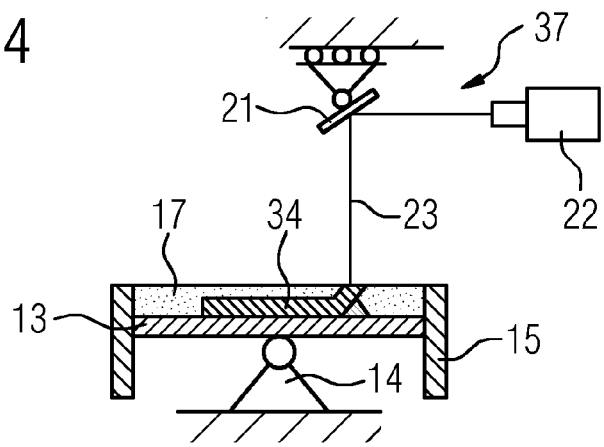

In FIG. 4, a device 37 for laser melting is used, consisting of the laser 22 and the deflecting optical system 21. This allows the laser beam 23 to be directed onto the building platform 13. To be able to carry out laser melting there, the building platform 13 is provided with the side delimitation 15 and a powder bed 17 is produced in the well-like depression that is formed by the building platform 13 and the side delimitation 15. With the laser beam 23, the powder bed is then melted layer by layer. This means that the production step according to FIG. 4 is repeated for subsequent layers (not represented in FIG. 4). A mold 38 (cf. FIG. 5) is thereby created in the powder bed 17.

Figure 5:
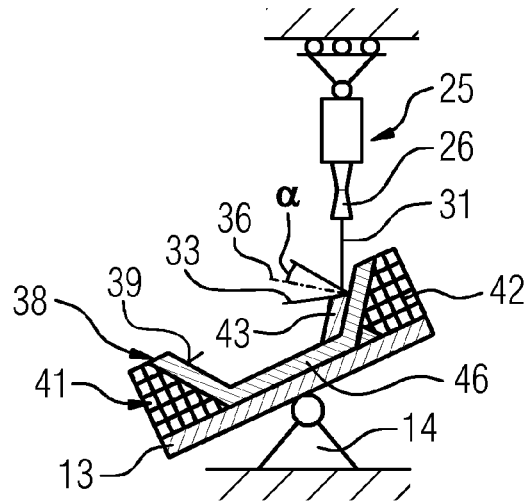

In FIG. 5 it can be seen how the mold 38 is constructed. It has a solid part, which forms a wall surface 39, which predefines the contour of a component 40 to be manufactured (cf. FIGS. 10 and 11). In order that the wall thickness of the structure forming the wall surface 39 can be chosen to be as small as possible, also provided is a framework 41, which consists of individual struts 42. As a result, the mold 38 is outwardly reinforced. The framework is supported on the building platform 13, so that forces occurring can be introduced there. It can also be seen that the starting layer 34 according to FIG. 4 then forms part of the mold 38, and consequently also provides part of the wall surface 39.

In FIG. 5 it can also be seen how a peripheral layer 43 of the component to be produced is produced by the device 25 for cold-gas spraying. For this purpose, the building platform 13, and consequently the mold 38 as a whole and the nozzle 26, are pivoted in such a way that the coating jet 31 is aligned tangentially in relation to the wall surface 39, so that the peripheral layer 43 does not adhere there. As already explained, for this it is sufficient that the coating jet 31 lies outside the spray cone 33 intended for the wall surface 39. A peripheral layer 43 may also be produced on the opposite side of the mold, as FIG. 6 reveals.

Figure 6:
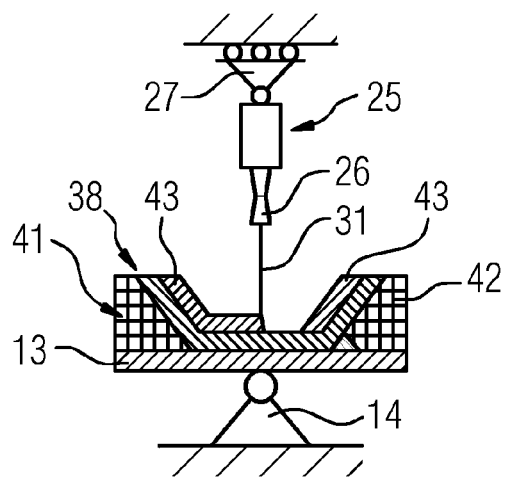

In FIG. 6 it can also be seen that the mold can subsequently be filled with material with the device for cold-gas spraying 25. In this way, the component 40 is successively created, the peripheral layer 43 that can still be seen in FIG. 6 becoming an integral part of the component 40. It should be noted here that the surface of the peripheral layer 43 is coated with the particles of the coating jet 31 in an adhering manner. As already described, this can be achieved by pivoting of the device 25 and of the building platform 13, this not being represented any more specifically in FIG. 6. In FIG. 6, the coating jet 31 is aligned perpendicularly and the building platform 13 is horizontal. However, these two components may also be pivoted such that adherence of the component to the bottom of the mold does not take place and the surface of the peripheral layers 43 is respectively aligned such that the coating jet 31 lies in the respective spray cone (not represented any more specifically, cf. FIGS. 2, 3 and 5).

Figure 7:
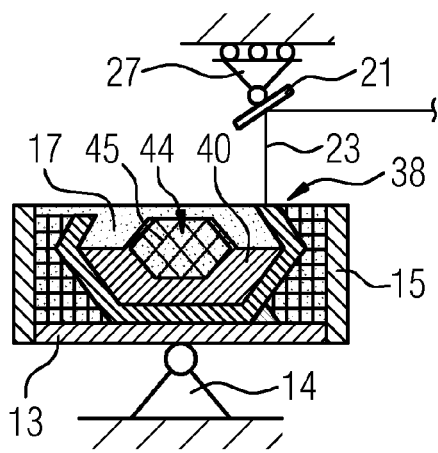

In FIG. 7 it can be seen that the component 40 to be manufactured is only half finished. The reason for this is that this component has undercuts and the mold 38 could therefore not be filled by the cold-gas spraying in one production step. For this reason, according to FIG. 7, the thermal spraying operation is interrupted and a powder bed 17 is produced once again at the level of the component manufactured thus far. For producing the powder bed, the building platform 13 is usually brought into a horizontal position again. In this case, the surface of the powder bed is aligned parallel to the surface 35 of the building platform. If the geometrical requirements of the component to be manufactured so require, it is however also possible to deviate from a horizontal alignment.

Figure 8:
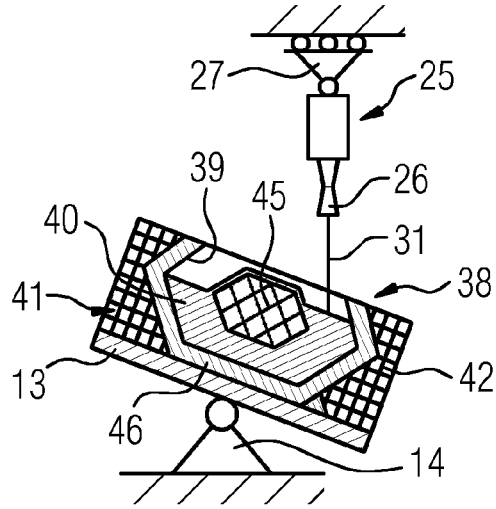

FIG. 7 shows how the mold 38 is completed by laser melting, while the finished mold 38 can be seen in FIG. 8. Furthermore, a partial volume 44 in the interior of the component 40 is also produced by means of the laser melting. This is a cavity, which is filled by a lattice structure 45 that is produced by the laser melting. The production of this lattice structure 45 stiffens the component 40 and reduces the weight of the component. The powder of the powder bed that is enclosed in the partial volume 44 and has not been melted can positively influence the damping behavior of the component 40 under oscillating loading as a result of relative movements.

In FIG. 8 it can be seen that, by analogy with the production step according to FIG. 6, the mold 38 is filled with the material of the component by the device 25 for cold-gas spraying. In this case, the partial volume 45 is enclosed in the component. The component 40 manufactured in this way has consequently been produced in the powder bed by a combination of thermal spraying and additive manufacturing.

As already explained, the mold 38 may also be produced in the powder bed by a combination of the processes of thermal spraying and additive manufacturing. Consequently, the starting layer 34 is a partial volume 46 of the mold 38 according to FIG. 5, which unlike the rest of the mold 38 has been produced by the thermal spraying process.

Figure 9:
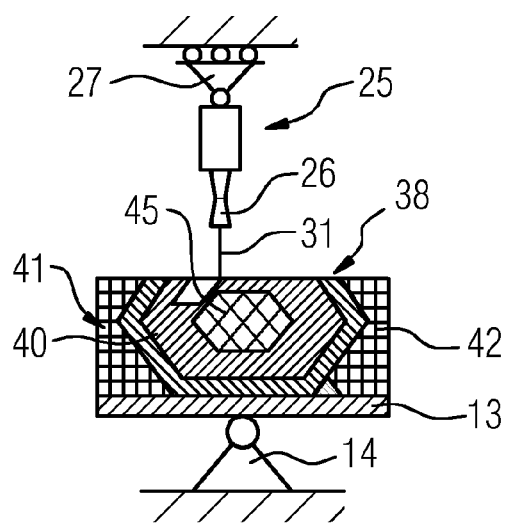

While in FIG. 8 it is ensured by suitable pivoting angles of the building platform 13 and the device 25 that an adherence between the wall surface 39 of the mold 38 and the material of the component 40 is ruled out (cf. also the statements made in relation to FIG. 5), according to FIG. 9 the final form of the component 40 with the inclusion of the lattice 45 is finished by means of cold-gas spraying. Here, the building platform 13 is again aligned horizontally and the coating jet 31 is aligned vertically.

Figure 10:
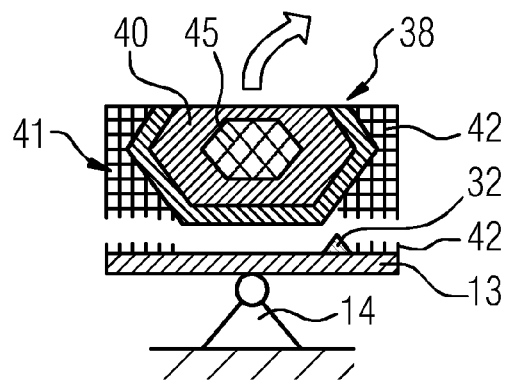

FIG. 10 reveals how the finished component 40 together with the mold 38 is separated from the building platform 13 (for example by wire spark erosion, not represented any more specifically). It can be seen in FIG. 10 that the points of attachment of the mold 38 merely consist of the struts 42 and the ridge 32, for which reason detachment can be achieved with little effort. In this way, the subsequent smoothing of the building platform 13, which must be prepared for the manufacture of the next component, is also advantageously made easier.

Figure 11:
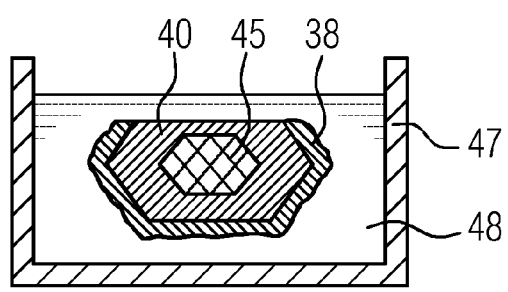

Because of the undercuts, in order to demold the component 38 it is necessary to destroy the mold. FIG. 11 shows that the interconnected assembly comprising the component 40 and the mold can be introduced into a container 47 with a bath 48. The material of the mold 38 is dissolved in this bath 48, while the component 40 is not attacked by the bath. This could be ensured for example by the mold 38 being produced from a less precious metal than the component 40. As an alternative to dissolving of the mold 38, it may also be destroyed mechanically. In particular, since adherence of the component 40 to the mold 38 can be ruled out, or at least minimized, if the coating jet 31 is guided correctly, once they have been mechanically destroyed the parts of the mold 38 fall off the component 40. If the component 40 can be produced without any undercuts, it can also be demolded without destroying the mold 38.

What is claimed is:

1. A method for manufacturing a component, the method comprising:
    producing a mold for the component layer-by-layer on a horizontal building platform using a generative process incorporating data describing the mold, wherein the mold includes at sidewalls having at least a portion of non-vertical walls;
    building the component in the mold by filling the mold with a building material using thermal spraying with a coating jet;
    pivoting the building platform from horizontal to a different angle to change an orientation of the coating jet with respect to the sidewalls, resulting in the coating jet spraying tangentially to the non-vertical portion of the sidewalls; and
    removing the mold from the component;
    wherein the mold includes an interior wall surface defining a contour of the component and struts transferring forces from the interior wall to the building platform, and wherein the struts maintain the interior wall surface to eliminate distortion of the contour as the component is built.

2. The method as claimed in claim 1, wherein the thermal spraying comprises cold-gas spraying.

3. The method as claimed in claim 1, wherein the generative process comprises at least one of the group consisting of: selective laser melting, selective laser sintering, and selective electron-beam melting.

4. The method as claimed in claim 1, further comprising alternating generating a layer of the mold with filling the mold with a layer of the building material.

5. The method as claimed in claim 1, wherein the struts form a framework.

6. The method as claimed in claim 1, further comprising applying the building material to the component on a wall surface of the mold with a direction of the coating jet that lies within a spray cone provided for the thermal spraying with respect to a surface of the component and outside the spray cone provided for the thermal spraying with respect to the wall surface.

7. The method as claimed in claim 1, further comprising using the generative production process to produce a partial volume of the component.

8. The method as claimed in claim 1, further comprising using the thermal spraying process to produce a partial volume of the mold.

* * * * *